United States Patent [19]

Meier et al.

[11] Patent Number: 4,694,041

[45] Date of Patent: Sep. 15, 1987

[54] POLYMERIZABLE COMPOSITIONS AND THE USE OF ARYLAMINES AS HARDENING ACCELERATORS FOR THESE COMPOSITIONS

[75] Inventors: Helmut-Martin Meier, Hattingen; Rolf Dhein, Krefeld; Jens Winkel, Cologne; Gerhard Klein, Monheim; Werner Klöker, Krefeld, all of Fed. Rep. of Germany

[73] Assignee: Bayer Aktiengesellschaft, Leverkusen, Fed. Rep. of Germany

[21] Appl. No.: 896,661

[22] Filed: Aug. 14, 1986

Related U.S. Application Data

[63] Continuation of Ser. No. 676,484, Nov. 29, 1984, abandoned.

[30] Foreign Application Priority Data

Dec. 13, 1983 [DE] Fed. Rep. of Germany ....... 3345102

[51] Int. Cl.$^4$ ............................................. C08L 67/00
[52] U.S. Cl. .................................... 525/25; 523/503; 525/26; 526/301; 526/302
[58] Field of Search .................... 523/503; 525/25, 26; 526/301, 302

[56] References Cited

U.S. PATENT DOCUMENTS

| | | | |
|---|---|---|---|
| 3,907,865 | 9/1975 | Miyata et al. | 526/301 |
| 3,926,755 | 12/1975 | Marans et al. | 525/26 |
| 4,001,348 | 1/1977 | Selbeck et al. | 525/26 |
| 4,429,096 | 1/1984 | Schaefer | 526/302 |
| 4,451,627 | 5/1984 | Frisch, Jr. et al. | 526/302 |

OTHER PUBLICATIONS

Meier et al., "Polymerizable Comp. and the Use of Arylamines as Hardening Accelerators in Them," CA(103)24, 196858y.

Winkel et al., "Amines and Their Use in Radical pzn Compositions," CA103(16):124112c.

Primary Examiner—John C. Bleutge
Assistant Examiner—D. W. Woodward
Attorney, Agent, or Firm—Connolly and Hutz

[57] ABSTRACT

The invention relates to the use of novel N,N-disubstituted arylamines containing polymerizable groups as hardening accelerators for polymerizable compositions based on unsaturated polyester resins, in particular for trowelling and water compositions.

10 Claims, No Drawings

POLYMERIZABLE COMPOSITIONS AND THE USE OF ARYLAMINES AS HARDENING ACCELERATORS FOR THESE COMPOSITIONS

This is a continuation of application Ser. No. 676,484 filed Nov. 29, 1984, abandoned.

The present invention relates to the use of novel N,N-disubstituted arylamines containing polymerisable groups as hardening accelerators for polymerisable compositions based on unsaturated polyester resins, in particular trowelling and mortar compositions.

It is known that moulding materials based on cold-hardenable polyester casting reins can be hardened using N,N-dialkylarylamines as polymerisation accelerators (U.S. Pat. No. 2,480,928). It is also known that unsaturated polyesters can be prepared by incorporating N,N-bis-$\beta$-hydroxyalkyl)-arylamines and moulding materials based on these polyesters can be cold-hardened in the presence of diacyl peroxides (German Patent Specification No. 919,431). It is furthermore known that N,N-bis-$\beta$-hydroxyalkyl)-arylamines can be reacted with dicarboxylic acids to give a polyester or with diisocyanates to give a polyurethane and the resulting products can be added to unsaturated polyester resin compositions as hardening accelerators (DE-OS (German Published Specification) No. 1,943,954 and German Patent Specification No. 1,643,972). It is likewise known from DE-OS (German Published Specification) No. 3,202,090 and EP-OS (European Published Specification) No. 84,784 that primary amines can be reacted with bis-epoxides in a first stage and with mono-epoxides in a second stage to give oligomeric hardening accelerators and these can be used for hardening ethylenically unsaturated compositions.

The accelerators mentioned, which are freely dissolved in the resin, can migrate or be extracted both before and after hardening, or their reactivity is low because of their polymeric character.

The object of the invention is to provide accelerators which do not have the disadvantages described above and which are added in monomolecular form to the resin and incorporated in these during hardening.

This object is achieved by means of the tertiary amines described below, which contain urethane or urea groups and (meth)acrylate groupings and which moreover surprisingly have a higher activity in respect of free radical formation than the corresponding tertiary amines without unsaturated groups.

The tertiary aromatic amines to be used according to the invention as accelerators for the polymerisation of polyester resins correspond to the general formula (I):

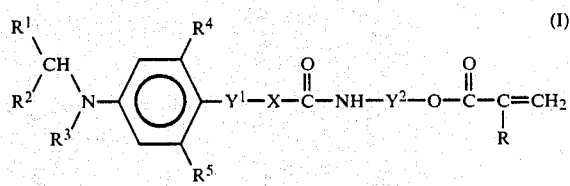
(I)

in which
R represents hydrogen or a methyl group, $Y^1$ represents an optionally branched alkyl radical with 1 to 6 C atoms, preferably 1 to 3 C atoms,
$Y^2$ represents an optionally branched alkylene radical with 2 to 8 C atoms, preferably 2 to 5 C atoms, X denotes oxygen or a —NH— group,
$R^1$ and $R^2$ are identical or different and denote hydrogen, or an alkyl, alkenyl, cycloalkyl, cycloalkenyl, aryl, aralkyl or alkaryl group which has 1 to 11 C atoms and is optionally substituted by one or more (preferably only one) hydroxyl, amino, epoxy, urethane, urea, ester or ether groups, or
$R^1$ and $R^2$ together form a 3-membered to 6-membered ring, which optionally contains nitrogen, oxygen or sulphur as hetero-atoms,
$R^3$ has the meaning of $R^1$ or represents the group

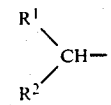

or $R^2$ and $R^3$, together with the

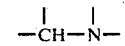

group, form a 5-membered or 6-membered ring, which optionally contains oxygen as a further hetero-atom, and
$R^4$ and $R^5$ are identical or different and represent hydrogen, an alkyl or alkenyl group which has 1 to 10 C atoms and is optionally substituted by halogen, or halogen.

Compounds which are preferred according to the invention are those in which $R^1$ represents hydrogen. $R^2$ furthermore preferably represents hydrogen or methyl (in particular hydrogen); $R^3$ is preferably methyl or ethyl, in particular methyl. $R^4$ and $R^5$ preferably represent hydrogen or methyl.

The invention also relates to unsaturated polyester resin compositions which contain the amines of the formula (I) in an amount corresponding to a content of tertiary nitrogen of 0.01 to 0.4% by weight, preferably 0.02 to 0.2% by weight, based on the total composition.

The compounds of the general formula (I) to be used according to the invention can be prepared by a process in which tertiary amines of the general formula (II)

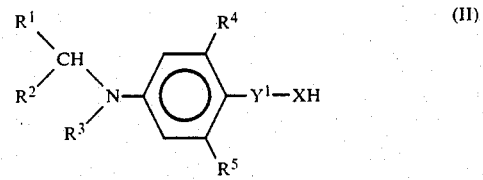
(II)

are reacted with isocyanates of the general formula (III)

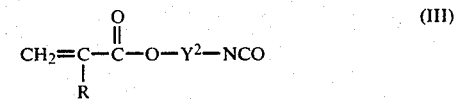
(III)

wherein
R, $R^1$ to $R^5$, $Y^1$, $Y^2$ and X have the abovementioned meaning,
as a rule at temperatures between $-30°$ C. and $150°$ C., preferably between $0°$ and $50°$ C., if appropriate in an inert organic solvent.

The amines of the formula (II) and isocyanates of the formula (III) used for the preparation of the compounds to be employed according to the invention are known or can be prepared by processes which are known per se:

The amines of the formula (II) can be obtained by methods which are known from the literature, such as those described, for example, in G. Ferri, Reaktionen der organischen Synthese [Reactions of Organic Synthesis], Georg Thieme-Verlag, Stuttgart (1978) , in chapter 1.3 and in chapter 8. Synthesis routes for isocyanates of the formula (III) are described, for example, in U.S. Pat. Nos. 2,718,516 and 2,821,544.

Isocyanates of the formula (III) can in general also be obtained by reacting dihydrooxazines, optionally in the form of acid adducts, with phosgene at $-20°$ to $+20°$ C. in a water-immiscible solvent in the presence of an aqueous solution of a base, the dihydrooxazines having the general formula

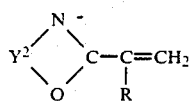
(IV)

The dihydrooxazines (IV) to be used as starting materials are prepared by processes analogous to those of the prior art. Thus, the starting compounds (IV) can be prepared, for example, from N-hydroxy-methylamides of the general formula

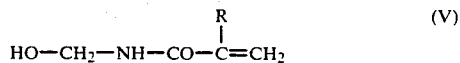
(V)

and an olefine by the process described in Liebigs Annalen 697, pages 171-180 (1966).

They are more advantageously obtained from formaldehyde, a nitrile of the general formula

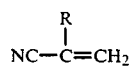
(VI)

and an olefine by a process analogous to that described in Synthesis (1971), pages 92-95.

In this process, formaldehyde is reacted with the nitrile of the general formula (VI) in a solvent in the presence of equimolar amounts of a strong acid in a temperature range between 30° and 100° C., preferably at 50°-60° C.

The amidomethylium ion thereby formed, of the formula

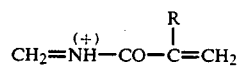
(VII)

reacts with the olefine in a polar cycloaddition reaction to give the acid adduct of the dihydrooxazine, from which the dihydrooxazine (IV) which is suitable as the starting material can be obtained by treatment with a base, which is known per se.

The formaldehyde here can be obtained either by depolymerisation from paraformaldehyde or from 1,3,5-trioxane. Solvents which can be used are carboxylic acids, carboxylic acid anhydrides, ethers, such as, for example, tetrahydrofuran, dioxane, glyme or diglyme, amides, such as, for example, N-methylpyrrolidone, urea, such as, for example, 1,3-dimethylpyrrolid-2-one, or sulpholane. Carboxylic acids, in particular acetic acid, are preferred.

Possible strong acids are sulphuric acid, phosphoric acid, hydrochloric acid, hydrofluoric acid, fluoboric acid and sulphonic acids. Sulphuric acid is most advantageously used. Exclusion of water is to be ensured in all cases.

The nitrile is added in equimolar amounts to a solution of formaldehyde and the strong acid in the solvent in a temperature range of between 30° and 100° C., preferably at 50°-60° C. Possible olefines or olefine mixtures are, for example, cis-but-2-ene, trans-but-2-ene and but-1-ene, if appropriate as a mixture. Such technical grade butene mixtures, which also contain inert butanes, in addition to reactive butenes, are obtained, for example, as the $C_4$ fraction in distillative separation of the cleavage products from naphtha crackers. Other large-scale industrial $C_4$ fractions of naphtha crackers with a high content of iso-butene permit the preparation of dihydrooxazine mixtures with a high content of 6,6-dimethyl-substituted isomers. Since the but-1-ene contained in the factrions mentioned is slower to react than cis-and trans-but-2-ene, the content of 6-ethyl-2-vinyl-5,6-dihydrooxazine in the dihydrooxazine mixtures is generally lower than the content of but-1-ene in the $C_4$ fraction employed.

The reaction between the acid adduct of the dihydrooxazine and the olefine or olefine mixture can be carried out in an open vessel by passing through or dropwise addition of the olefine, or under pressure in the case of gaseous olefines.

The dihydrooxazine in formed from the amidomethylium ion (VII) and the olefine in a stereospecific cis-addition reaction (see Chem. Ber. 103, 3242 (1970). A corresponding cis/trans mixture of the 5,6-dimethyl-dihydrooxazine is therefore formed from a cis/trans-olefine mixture.

As already mentioned, the free dihydrooxazine can be liberated from the resulting acid adduct by means of a base, such as, for example, sodium hydroxide or potassium hydroxide, in a manner which is known per se. However, it is also possible to use the dihydrooxazines in the form of their acid adducts.

The dihydrooxazines or dihydrooxazine mixtures are preferably phosgenated by the known two-phase phosgenation process, such as is described, for example, in DE-AS (German Published Specification) No. 1,924,535 for the phosgenation of oxazolines or dihydrooxazines. In general, 1 to 2 mol of phosgene are employed here per mol of dihydrooxazine or per mol of acid adduct of the dihydrooxazine or dihydrooxazine mixture, and at least 2 mol of an aqueous base are employed per mol of phosgene. If acid adducts of the dihydrooxazines are used, an amount of base equivalent to the acid is also additionally required.

Aqueous solution of alkali metal hydroxides and carbonates can be used as bases. Aqueous sodium hydroxide solution is preferred. The dihydrooxazine and the phosgene are in general employed as solutions in a non-polar, water-immiscible solvent. Possible solvents for this are hydrocarbons, halogenohydrocarbons, such as, for example, methylene chloride, chloroform, 1,2-dichloropropane, chlorobenzene and dichlorobenzene, esters, such as, for example, ethyl acetate, or ethers, such as diethyl ether or dibutyl ether. The use of halogenohydrocarbons, in particular methylene chloride, is most advantageous.

The solutions of the dihydrooxazine, the phosgene and the base are simultaneously and uniformly added to the reaction vessel. Intensive thorough mixing is to be ensured here. The temperature is kept at $-20°$ to $+20°$ C., preferably between $0°$ and $5°$ C. Since the reaction proceeds very rapidly, a continuous reaction procedure is advantageous.

"Unsaturated polyester resins" are preferably to be understood, according to the invention, as mixtures of 20 to 75% by weight (based on the total resin) of $\alpha,\beta$-ethylenically unsaturated polyesters and 80 to 25% by weight of monomers which are copolymerisable with these polyesters, such as those described, for example, by J. R. Lawrence, "Polyester Resins", Reinhold Publ. Corp., New York 1960, page 18 et seq., and in Kunststoff-Handbuch [Plastics Handbook], Volume VIII ("Polyesters"), Carl Hanser Verlag, Munich 1973, pages 247–312.

The unsaturated polyesters to be used can be obtained by processes which are known per se, for example by polycondensation of at least one $\alpha,\beta$-ethylenically unsaturated dicarboxylic acid with 4 to 20 C atoms (or ester-forming derivatives thereof), if appropriate mixed with one or more dicarboxylic acids which have 4 to 20 C atoms and contain no unsaturated aliphatic groups (or ester-forming derivatives thereof), with at least one dihydric alcohol with 2 to 30 C atoms. Unsaturated dicarboxylic acids containing no unsaturated aliphatic groups, or their derivatives, which are preferably to be used are phthalic acid or phthalic anhydride, isophthalic acid, terephthalic acid, hexa- or tetra-hydrophthalic acid or anhydrides thereof, endomethylenetetrahydrophthalic acid or the anhydrides thereof, succinic acid or succinic anhydride and succinic acid esters and chlorides, glutaric acid, adipic acid, sebacic acid and trimellitic acid. In order to prepare resins which are difficult to ignite, it is possible to use, for example, hexachloroendomethylenetetrahydrophthalic acid, tetrachlorophthalic acid or tetrabromophthalic acid. Flame-repellency can also be achieved by adding halogen-containing compounds which are not cocondensed in the polyester, such as, for example, a chloroparaffin. Polyesters which are preferably to be used contain maleic acid radicals, up to 50 mol % of which can be replaced by phthalic acid radicals or isophthalic acid radicals. Preferred dihydric alcohols are ethylene glycol, propane-1,2-diol, propane-1,3-diol, diethylene glycol, dipropylene glycol, butane-1,3-diol, butane-1,4-diol, neopentylglycol, 2-ethylpropane-1,3-diol, hexane-1,6-diol, perhydrobisphenol, oxyalkylated bis-phenols and the like. The acid number of the polyester can be between 1 and 100, the OH numbers can be between 10 and about 150 and the calculated molecular weight can be between about 500 and 10,000, preferably between about 700 and 3,000 (calculated from the acid and OH number).

Perferred copolymerisable vinyl and vinylidine compounds in the compositions according to the invention are the unsaturated compounds which are customary in polyester technology and preferably carry $\alpha$-substituted vinyl groups or $\beta$-sustituted allyl groups, in particular styrene, but also, for example, nuclear-chlorinated and -alkylated or -alkenylated styrenes, it being possible for the alkyl groups to contain 1-4 carbon atoms, such as, for example, vinyltoluene, divinylbenzene, $\alpha$-methylstyrene, tert.-butylstyrenes and chlorostryrenes; vinyl esters of carboxylic acid with 2–6 carbon atoms, preferably vinyl acetate; vinylpyridine, vinylnaphthalene, vinylcyclohexane, acrylic acid and methacrylic acid and/or their esters (preferably vinyl, allyl and methallyl esters) with 1–4 carbon atoms in the alcohol component, their amides and nitriles, maleic anydride, maleic acid half-esters and diesters with 1 to 4 carbon atoms in the alcohol component, maleic acid half-amides and diamides or cyclic imides, such as N-methylmaleimide or N-cyclohexylmaleimide, and allyl compounds such as allylbenzene and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

The compositions according to the invention contain 0.01 to 0.4% by weight, preferably 0.02 to 0.2% by weight, of active nitrogen in the form of compounds of the formula (I). The compositions are stable on storage.

In order to protect the compositions according to the invention from undesirable premature polymerisation, even on prolonged storage, 0.001–0.5 part by weight, based on the total resin, of polymerisation inhibitors or antioxidants are preferably added. Examples of preferred auxiliaries of this type are phenyls and phenyl derivatives, preferably sterically hindered phenyls containing alkyl substituents with 1 to 6 C atoms in both o-positions relative to the phenolic hydroxyl group, amines, preferably secondary arylamines and their derivatives, quinones, copper salts of organic acids and addition compounds of copper-1 halides and phosphites, such as, for example, 4,4'-bis-(2,6-di-tert.-butylphenol), 1,3,5-trimethyl-2,4,6-tris-(3,5-di-tert.-butyl-4-hydroxybenzyl)-benzene, 4,4'-butylidine-bis-(6-tert.-butyl-m-cresol), 3,5-di-tert.-butyl-4-hydroxybenzylphosphonic acid diethyl ester, N,N'-bis-($\beta$-naphthyl)-p-phenylenediamine, N,N'-bis-(1-methylheptyl)-p-phenylenediamine, phenyl-$\beta$-naphthylamine, 4,4'-bis-($\alpha,\alpha$-dimethylbenzyl)-diphenylamine, 1,3,5-tris-(3,5-di-tert.-butyl-4-hydroxy-hydroxycinnamoyl)-hexahydro-s-triazine, hydroquinone, p-benzoquinone, toluhydroquinone, p-tert.-butylpyrocatechol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite and p-nitrosodimethylaniline. Other preferred stabilisers are described in "Methoden der organischen Chemie" ["Methods of Organic Chemistry"] (Houben-Weyl), 4th edition, Volume XIV/1, pages 433–452., Georg Thieme-Verlag, Stuttgart, 1961. Hydroquinone, for example, in a concentration of 0.01–0.05 part by weight per 100 parts by weight of unsaturated polyester is particularly suitable.

Before the hardening, polymerisation initiators, preferably diacyl peroxides or percarbonates, are added to the resins in amounts of 0.5 to 10% by weight, preferably 1 to 5% by weight, based on the resin to be hardened. Example of preferred initiators are diacetyl peroxide, dibenzoyl peroxide, di-p-chlorobenzoyl peroxide, bis-(2-methylbenzoyl)-peroxide, phthaloyl peroxide, succinyl peroxide, dilauroyl peroxide, acetylcyclohexanesulphonyl peroxide, isopropyl percarbonate, cyclohexyl percarbonate and bis-(4-tert.-butylcyclohexyl) percarbonate. Other suitable initiators are peroxyesters, such as tert.-butyl peroxyacetate, tert.-butyl peroxybenzoate, tert.-butyl peroctoate, dicyclohexyl peroxydicarbonate or 2,5-dimethylhexane 2,5-diperocoate, alkyl peroxides, such as bis-(tert.-butylperoxybutane), dicumyl peroxide and tert.-butyl cumyl peroxide, hydroperoxides, such as cumene hydroperoxide, tert.-butyl hydroperoxide, cyclohexanone hydroperoxide and methyl ethyl ketone hydroperoxide, and perketals or ketone peroxides, such as acetylacetone peroxide.

These free radical initiators are preferably added to the compositions according to the invention in the form of a paste in a suitable diluent, such as, for example, dioctyl phthalate or similar plasticisers which are known per se. The paste preferably contains about 50% of initiator.

The compositions according to the invention can contain, as chemical thickeners, oxides and/or hydroxides of the metals of main group 2 of the periodic table, preferably of magnesium and calcium, in amounts of 0.1–10, preferably 1.0–4.0, parts by weight per 100 parts by weight of resin. The chemical thickeners mentioned can also be partly replaced by zinc oxide.

The compositions can furthermore also contain 5 to 100, preferably 10 to 40, parts by weight of fibrous reinforcing materials per 100 parts by weight of the resin. Suitable reinforcing materials are inorganic fibres, such as metal, asbestos, carbon and, in particular, glass fibres, and organic fibres, for exmple cotton, polyamide, polyester, polyacrylonitrile or polycarbonate fibres.

Possible inorganic fillers which can be used, for example, in amounts of 50 to 500 parts by weight per 100 parts by weight of the resin are, for example, chalk, talc, quartz flour, slate flour, kaolin, calcite, dolomite, mica, barite, kieselguhr and aluminas.

Examples of other customary additives which can also be used are organic and inorganic pigments, dyestuffs, lubricants and release agents, such as zinc stearate, thixotropic agents, UV absorbers, shrinkage-reducing additives and the like.

The polymerisable polyester resin compositions according to the invention are particularly suitable as mortars and trowelling compositions. However, it is also possible to produce all types of cold-hardening moulded articles from them, for example in the most diverse fields of the construction industry, the electrical industry, boat-building and the motor vehicle industry.

The following examples serve to illustrate the invention. Unless indicated otherwise, the amounts stated are to be understood as parts by weight or percentages by weight.

Starting materials

1. Polyester resin I:

A polyester is prepared from 89 mol of diethylene glycol, 13 mol of ethylene glycol and 98.1 mol of maleic acid anhydride by melt condensation. At the same time, 42.1 mol of dicyclopentadiene are added. The resin is then dissolved in styrene to give a 63% strength solution and the solution is stabilised with 0.04% of chloranil and 0.01% of copper naphthenate, in each case based on the pure polyester resin. the resulting polyester resin has a viscosity of 480 mPas (at 25° C.) and an acid number of 10.

2. Polyester resin II:

This resin is an unsaturated polyester resin obtainable from Bayer AG under the nane Leguval ® w 18. It is used as a basic resin for preparing mortar.

Formulae of the accelerators employed

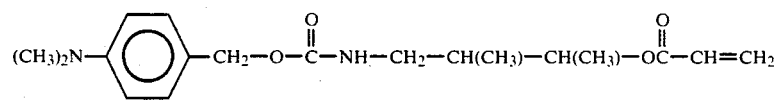

(A)

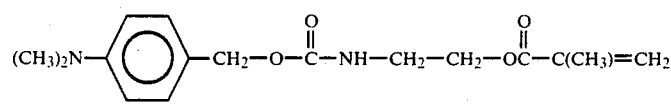

(B)

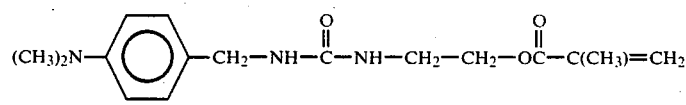

(C)

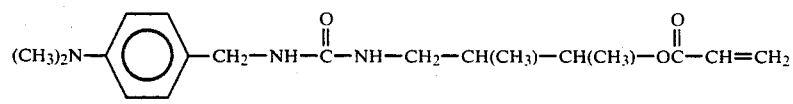

(D)

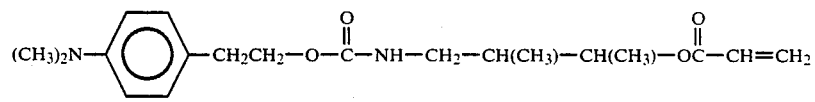

(E)

Polycondensation product of 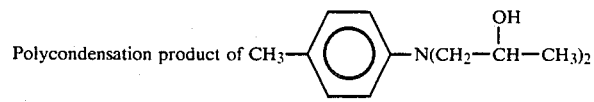

and $HO_2C-(CH_2)_4-CO_2H$ (comparison)

Use Examples

Cold-hardenable casting resin compositions are prepared from the polyester resins I and II using the abovementioned accelerators. The content of aromatically bonded nitrogen in the resin stated in the following table enables the reactivity of the individual accelerators to be compared. The reactivity is determined by hardening the accelerator/resin mixture at an initial temperature of 25° C. using 2% of benzoyl peroxide paste (50% strength). The gelling time, hardening time and maximum temperature are determined in accordance with DIN 16,945.

| Accelerator | % by weight in the resin | % of N in the resin | Gelling time (minutes) | Hardening time (minutes) | Maximum temperature (°C.) |
|---|---|---|---|---|---|
| Hardening in polyester resin I | | | | | |
| A | 1.52 | 0.064 | 6.1 | 9.8 | 108 |
| B | 1.52 | 0.07 | 6.2 | 9.6 | 105 |
| C | 1.39 | 0.064 | 4.4 | 7.2 | 110 |
| D | 1.61 | 0.064 | 4.6 | 7.2 | 108 |
| E | 1.58 | 0.064 | 3.6 | 6.0 | 108 |
| Comparison | 2.0 | 0.064 | 11.0 | 17.2 | 110 |
| Hardening in polyester resin II | | | | | |
| E | 1.49 | 0.064 | 1.9 | 4.5 | 154 |
| D | 1.43 | 0.060 | 2.3 | 4.8 | 158 |
| Comparison | 1.85 | 0.060 | 4.3 | 7.0 | 144 |

We claim:

1. Unsaturated polyester resin composition containing an N,N-dialkylarylamine as the polymerization accelerator, wherein the accelerator is a compound of the formula

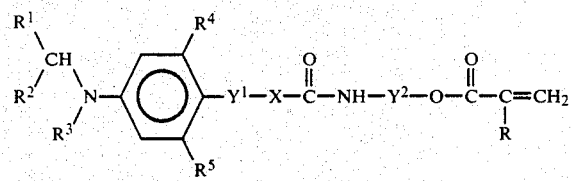

wherein
R is hydrogen or methyl,
$Y^1$ is a branched or straight chain alkyl with 1 to 6 carbon atoms,
$Y^2$ is a branched or straight chain alkylene with 2 to 8 carbon atoms,
X is oxygen or —NH—,
$R^1$ and $R^2$ are identical or different and each is hydrogen, alkyl, alkenyl, cycloalkyl, cycloalkyl, cycloalkenyl, aryl, aralkyl or alkaryl group which has 1 to 11 carbon atoms and which is unsubstituted or substituted by one or more hydroxyl amino, epoxy, urethane, urea, ester or ether groups,
or $R^1$ and $R^2$ together form a 3-membered to 6-membered ring, which is carbocyclic or contains a nitrogen, oxygen or sulphur hetero-atoms,
$R^3$ has the meaning of $R^1$ or is

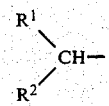

or $R^2$ and $R^3$, together with the adjacent

form a 5-membered or 6-membered ring, which contains only the nitrogen atom as a heterocyclic ring member or which additionally is oxygen as a further heteroatom, and
$R^4$ and $R^5$ are identical or different and each is hydrogen, halogen, alkyl or alkenyl having 1 to 10 carbon atoms which is unsubstituted or substituted by halogen.

2. Composition according to claims 1, characterised in that the radical $R^1$ represents hydrogen.
3. Composition according to claim 1 or 2, characterised in that $R^2$ represents hydrogen or methyl.
4. Composition according to claim 1 or 2, characterised in that $R^3$ represents methyl or ethyl.
5. Composition according to claim 1 or 2, characterised in that $R^4$ represents hydrogen or methyl.
6. Composition according to claim 5, characterised in that both $R^4$ and $R^5$ represent hydrogen.
7. Composition according to claims 1 or 2 which contains the accelerator compound in an amount such that the content of tertiary nitrogen is 0.01 to 4% by weight, based on the total composition.
8. Composition according to claim 1 or 2, characterised in that it contains 20 to 75% by weight (based on the total resin) of α,β-ethylenically unsaturated polyesters and 80 to 25% by weight of monomers which can be copolymerised with these polyesters.
9. Composition according to claim 8, characterised in that the copolymerisable monomer is styrene.
10. In an improved process of hardening an unsaturated polyester resin-containing composition by reaction with a polymerization accelerator,
the improvement comprises said composition being reacted with a polymerization accelerating amount of compound of the formula

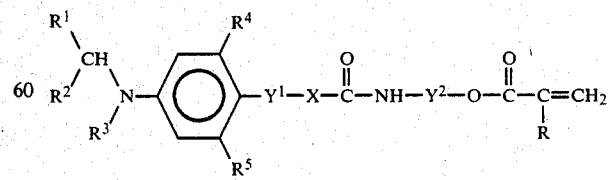

wherein
R is hydrogen or methyl,
$Y^1$ is a branched or straight chain alkyl with 1 to 6 carbon atoms, $Y^2$ is a branched or straight chain alkylene with 2 to 8 carbon atoms, X is oxygen or —NH—, $R^1$ and $R^2$ are identical or different and each is hydrogen, alkyl, alkenyl, cycloalkyl, cycloalkyl, cycloalkenyl, aryl, aralkyl or alkaryl group which has 1 to 11 carbon atoms and which is unsubstituted or substituted by one or more hydroxyl, amono, epoxy, urethane, urea, ester or ether groups, or $R^1$ and $R^2$ together form a 3-membered to 6-membered ring, which is carbocyclic or contains a nitrogen, oxygen or sulphur hetero-atoms, $R^3$ has the meaning of $R^1$ or is

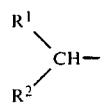

or $R^2$ and $R^3$ together with the adjacent

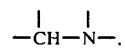

form a 5-membered or 6-membered ring, which contains only the nitrogen atom as a heterocyclic ring member or which additionally is oxygen as a further heteroatom, and $R_4$ and $R_5$ are identical or different and each is hydrogen, halogen, alkyl or alkenyl having 1 to 10 carbon atoms which is unsubstituted or substituted by halogen.

* * * * *